US008850682B2

(12) United States Patent
Garland et al.

(10) Patent No.: US 8,850,682 B2
(45) Date of Patent: Oct. 7, 2014

(54) REMOVAL OF COMPONENTS FROM AIRCRAFT

(75) Inventors: Philip Henry Garland, South Gloucestershire (GB); Nebojsa Sakota, South Gloucestershire (GB)

(73) Assignee: Airbus Operations Limited, Bristol (GB)

( * ) Notice: Subject to any disclaimer, the term of this patent is extended or adjusted under 35 U.S.C. 154(b) by 227 days.

(21) Appl. No.: 13/075,343

(22) Filed: Mar. 30, 2011

(65) Prior Publication Data

US 2011/0185553 A1 Aug. 4, 2011

Related U.S. Application Data

(62) Division of application No. 11/462,176, filed on Aug. 3, 2006, now Pat. No. 7,941,905.

(30) Foreign Application Priority Data

Aug. 4, 2005 (GB) .................................. 0516066.8

(51) Int. Cl.
*B23P 19/00* (2006.01)
*B64F 5/00* (2006.01)

(52) U.S. Cl.
CPC .................................. *B64F 5/0081* (2013.01)
USPC ..................... 29/426.1; 29/402.01; 29/402.03; 29/402.08; 29/559; 29/281.1; 269/32

(58) Field of Classification Search
USPC ......... 29/402.01, 402.08, 402.03, 426.1, 464, 29/559, 434, 252, 281.1; 244/54; 280/79.6; 269/32, 55, 71
See application file for complete search history.

(56) References Cited

U.S. PATENT DOCUMENTS

| 2,815,184 | A | * | 12/1957 | Irwin et al. | 244/54 |
| 3,432,911 | A | * | 3/1969 | Rodgers | 29/464 |
| 3,433,459 | A | * | 3/1969 | Logan | 254/281 |
| 3,592,421 | A | * | 7/1971 | Kopp | 248/554 |
| 3,666,211 | A | * | 5/1972 | Cathers et al. | 244/54 |
| 3,678,559 | A | * | 7/1972 | Zilkalns | 29/281.6 |
| 4,044,442 | A | * | 8/1977 | Carlson | 29/888.012 |
| 4,266,741 | A | * | 5/1981 | Murphy | 244/54 |
| 4,412,774 | A | * | 11/1983 | Legrand et al. | 414/589 |
| 4,603,821 | A | * | 8/1986 | White | 244/54 |

(Continued)

FOREIGN PATENT DOCUMENTS

| DE | 19716525 C1 * | 6/1998 | B64C 27/48 |
| GB | 2306155 A * | 4/1997 | F02C 7/00 |

(Continued)

OTHER PUBLICATIONS

British Search Report for GB0516066.8 dated Oct. 20, 2005.

*Primary Examiner* — Jermie Cozart
*Assistant Examiner* — Bayan Salone
(74) *Attorney, Agent, or Firm* — Lowe Hauptman & Ham, LLP

(57) ABSTRACT

A method of removing a component from an aircraft includes attaching a device comprising a guide member to the aircraft; attaching the component (such as an actuator) to the guide member; detaching the component from the rest of the aircraft; and moving the guide member so that the component follows a predefined path of removal of the component. A device for use in such a method is also described.

20 Claims, 9 Drawing Sheets

(56) References Cited

U.S. PATENT DOCUMENTS

| | | | | |
|---|---|---|---|---|
| 4,624,436 A | * | 11/1986 | Cooney et al. | 248/555 |
| 5,188,247 A | * | 2/1993 | Jastrow | 212/343 |
| 5,240,298 A | * | 8/1993 | Teaby et al. | 294/81.4 |
| 5,477,603 A | * | 12/1995 | Kemichick | 29/468 |
| 5,497,961 A | * | 3/1996 | Newton | 244/54 |
| 5,575,607 A | * | 11/1996 | Grout et al. | 414/589 |
| 6,141,862 A | * | 11/2000 | Matsui et al. | 29/714 |
| 6,367,141 B1 | * | 4/2002 | Cook et al. | 29/407.1 |
| 6,640,408 B2 | * | 11/2003 | Hedley et al. | 29/281.1 |
| 7,104,306 B2 | * | 9/2006 | Huggins et al. | 164/47 |
| 7,941,905 B2 | * | 5/2011 | Garland et al. | 29/402.08 |
| 8,074,926 B2 | * | 12/2011 | Baker | 244/93 |
| 2004/0003490 A1 | * | 1/2004 | Shahin et al. | 29/464 |
| 2010/0139069 A1 | * | 6/2010 | Daniels et al. | 29/402.01 |

FOREIGN PATENT DOCUMENTS

| | | | | |
|---|---|---|---|---|
| SU | 669651 | * | 1/1984 | B64F 5/00 |
| SU | 669651 A1 | | 1/1984 | |
| WO | 93/06008 A1 | | 4/1993 | |
| WO | WO 9306008 A1 | * | 4/1993 | B64F 5/00 |

* cited by examiner

REMOVAL OF COMPONENTS FROM AIRCRAFT

RELATED APPLICATIONS

The present application is a divisional of U.S. application Ser. No. 11/462,176 filed Aug. 3, 2006, which claims priority from, UK Patent Application Number 0516066.8 filed Aug. 4, 2005, the disclosures of which are hereby incorporated by reference herein in their entirety.

BACKGROUND

The present invention relates to a device for and method of removing a component (in particular, but not exclusively, actuators) from an aircraft.

The removal of components, in particular actuators, from aircraft (especially large aircraft) may be a difficult process. Many actuators used on large, modern aircraft (such as those that can function using both electrical and hydraulic power) are heavy (up to about 52 kg). The manual handling of such heavy actuators may risk damage to the aircraft or the actuator or injury to the personnel handling the actuator. Moreover, Health and Safety legislation in the UK at least does not permit removal of such actuators by hand, the use of a lifting device such as a winch being necessary. In some cases, a winch can readily be used to remove an actuator from an aircraft when the actuator is accessible from above; in such cases a portion of aircraft skin or panel can be removed from an upper surface of the aircraft wing, the winch then being used to raise the actuator above the wing before lowering it to the ground. The removal of an actuator from a wing by means of a winch is not however always practical, because there may be other components or structures obstructing access to and removal of the component by means of a winch.

Furthermore, with modern advances in aircraft wing design there is often little free space around the actuator. The removal of actuators and the like from aircraft can thus be difficult in view of there being little room to manoeuvre the component during its removal. The lack of free space can also result in there being no straightforward path of removal of the component from the aircraft.

The removal of components from large aircraft with relatively thin wings is particularly problematic because the space provided to accommodate the component is relatively small and the components are relatively large and heavy.

SUMMARY

The method and device of the present invention seek to mitigate at least some of the above-mentioned problems.

In accordance with a first aspect of the present invention, there is provided a device for facilitating the removal of a component from an aircraft, the device comprising:
an attachment portion for attaching the device to the aircraft; and
a guide member comprising a support portion for receipt of the component;
the guide member being so mounted that, when the device is used to remove a component from an aircraft with the component being supported by the support portion, the support portion moves away from the aircraft along a predefined path.

Such a device allows a component to be removed from an aircraft without risk of the component straying from a predefined path (typically a single path). Because the component does not stray from the predefined path, there is minimal or no risk of the removal of the component causing damage to the component, the rest of the aircraft or the personnel removing the component from the aircraft. This may be contrasted to the use of hoists or the removal of components by manual handling where the path of removal is not predefined, there being substantial risk of causing damage to the component, the rest of the aircraft and/or the personnel removing the component.

It is preferred that the device comprises a handle or handles for assisting in the movement of the guide member.

It is preferred that the guide member is pivotally mounted to allow, in use, the support portion to be movable away from the aircraft.

The device may comprise a plurality of, and preferably two, attachment portions.

Each attachment portion may be provided by a mounting component, such as a bracket.

It is preferred that the mounting component is attachable to a rib of the aircraft (typically a rib in the wing or tail of the aircraft).

It is preferred that the mounting component is readily detachable from the guide member.

The device may be arranged such that the axis of rotation of the pivotal mount of the guide member is remote from the component to be removed.

It is preferred that the mounting component forms part of the pivotal mount for the guide member.

It is preferred that the device is provided with a locking mechanism for securing the guide member in position to receive the component from the aircraft. This may be achieved by co-operation between the guide member and a mounting component, if present. For example, a bolt may extend through an aperture in the mounting component (typically a bracket) and into the guide member, thus securing the guide member for receipt of the component. The locking mechanism is preferably removable and replaceable.

It is preferred that the pivotal mount is at or near one end of the device and the handle or handles are at or near the other end of the device.

It is further preferred that the device is arranged to operate as a second order or second class lever. This refers to the load (the component being removed from the aircraft) being located between the fulcrum (provided by the pivotal mount) and the effort (provided at the handles).

It is preferred that the handle or handles is/are readily removable from the guide member. This facilitates easy storage of the device.

Alternatively or additionally, the handle or handles may be readily collapsible. This further facilitates easy storage of the device.

The guide member may comprise a frame and plate arranged across said frame. The plate may be in the form of sheet metal.

The guide member may be provided with one or more support members for supporting the component. The support members are preferably arranged to contact with the component. The length of one or more of the support members may be fixed at one of a plurality of values. The support member may comprise a cylindrical post or the like.

The device is preferably supplied with means for securing the component to the device. This may take the form of a belt.

One or more of the support members may be provided with a means of securing the component to the device. For example, a support member may be provided with a clamp. This may be especially beneficial if the component to be removed is an actuator having an actuating pin. In this case, the clamp may be secured around the actuating pin.

It is preferred that one or more of the support members projects substantially orthogonal to the plane generally defined by the guide member.

It is preferred that the device comprises two handles, further preferred that the handles extend substantially parallel to one another.

The device may comprise an adjuster for adjusting the position of the guide member along the pivotal axis. This permits the position of the guide member to be optimised for the receipt of a particular component. In the event that the device comprises two or more mounting components, then it is preferred that two or more of the mounting components are provided with said adjusters. The adjuster may comprise a screw, the rotation of which causes displacement of the guide member.

The device may further comprise a hoist support bar. It is preferred that the hoist support bar is, in use, attachable above the guide member. This allows a hoist to be supported above the component so that the component can be lowered safely to the ground.

In accordance with a second aspect of the present invention, there is provided a kit for facilitating the removal of a component from an aircraft, the kit comprising:
a guide member comprising a support portion for receipt of the component;
a set of one or more mounting components for attaching the guide member to the aircraft; and
a handle or handles for assisting in the movement of the guide member; the guide member being arranged to be pivotally attached to the one or more mounting components so that, when the kit is used to remove a component from an aircraft with the component being supported by the support portion, the support portion moves away in a pivoting motion from the aircraft along a predefined path.

Preferably the kit further comprises a handle, or handles, for assisting in the movement of the guide member.

The guide member may be pivotally attachable to the one or more mounting components. This provides a simple and convenient mechanism for removing a component from the aircraft.

The kit may comprise a plurality of sets of one or more mounting components. It is preferred that each set is associated with attachment to a particular part of an aircraft (and thus associated with the removal of a particular component).

The kit may further comprise a hoist and pulley arrangement.

The kit may further comprise a slide (for example, a set of rails) that, in use, allows the component to be lowered towards the ground.

There may be provided a storage container for the storage of the kit.

The kit may comprise those features described with reference to the device of the first aspect of the present invention.

In accordance with a third aspect of the present invention, there is provided a method of removing a component from an aircraft to which it is attached, by means of the use of a device in accordance with the first aspect of the present invention. The method may comprise the following steps:
  (a) providing a device in accordance with the first aspect of the present invention,
  (b) removing an outer panel of the aircraft to provide access to the component to be removed,
  (c) attaching the device to the aircraft,
  (d) attaching the component to be removed to the support portion of the device,
  (e) detaching the component from the aircraft, and
  (f) moving the support portion and the component away from the aircraft.

The device may have the features of the device of the first aspect of the present invention. For example, the device may be provided with one or more mounting components that are detachable from the guide member.

In accordance with a fourth aspect of the present invention, there is provided a method of removing an actuator from a wing or tail of an aircraft, the method comprising:
  (a) removing a panel from the underside of the wing or tail,
  (b) attaching a device for the removal of the actuator to the wing or tail of the aircraft,
  (c) attaching the actuator to a support portion of the device,
  (d) detaching the actuator from the aircraft, and
  (e) moving the support portion so as to lower the actuator.

In accordance with a fifth aspect of the present invention there is provided a method of removing a component from an aircraft, the method comprising:
(a) attaching a device comprising a guide member to the aircraft;
(b) attaching the component to the guide member;
(c) detaching the component from the rest of the aircraft; and
(d) moving the guide member so that the component follows a predefined path of removal of the component.

The device may be in accordance with the first aspect of the present invention. For example, the guide member may be provided by the device of the first aspect of the present invention.

The device may comprise a guide member that is separable from one or more mounting components which are attachable to the aircraft. Step (c) may comprise attaching the one or more mounting components to the aircraft and then attaching the guide member to the one or more mounting components.

The moving of the guide member along the predefined path may be assisted by the weight of the component. This provides a convenient way of removing a component from an aircraft.

It is preferred that the moving of the guide member is effected manually.

It is preferred that the path of removal comprises an arc. This allows a component to be removed from an aircraft by merely moving part of the guide member about a pivot point. The centre of rotation of the arc may be remote from the component to be removed. It will of course be appreciated that the predefined path of removal of the component may be any path sufficient to allow safe removal of the component. The path may need for example to comprise a plurality of sections representative of different movements. For example the path may comprise a linear section and a non-linear section.

It is preferred that an outer panel of the aircraft is removed prior to removal of the component.

The method may comprise, prior to step (b), removing an outer panel of the aircraft to provide access to the component to be removed, and wherein step (d) comprises moving the support portion and the component away from the aircraft. It is preferred that the device is attached to one or more ribs of the aircraft.

The path of removal may be on the underside of the aircraft. The invention is of particular application when the component is initially positioned in a wing or tail of an aircraft. In this case, it is preferable that the wing or tail includes an aileron or an elevator, which is moved to an elevated position prior to attaching the device to the aircraft.

The method according to the fifth aspect may further comprise lowering the component in a controlled manner after step (d), optionally using one or both of a hoist or a slide arrangement.

It is preferred that the mass of the device is less than 25 kg. The present invention is of particular application when the mass of the component to be removed from the aircraft is more than 25 kg.

In accordance with a sixth aspect of the present invention, there is provided a method of manufacturing a device for the removal of a component from an aircraft, the method comprising:

(a) identifying a path of removal of the component from the aircraft;

(b) designing a device provided with a guide member arranged such that when the component is attached to the guide member and when the guide member is attached to the aircraft, the guide member is arranged to move so that the component follows said path of removal of the component;

(c) manufacturing the device in accordance with the design.

There may of course be more than one possible path of removal. In such a case the path of removal is preferably chosen so as to be relatively simple compared to other possible paths.

It will of course be appreciated that features of one aspect of the present invention may be incorporated into another aspect of the invention. The methods of the third, fifth and sixth aspects of the present invention are preferably used to remove actuators from aircraft, such as those actuators that are used to control the movements of ailerons, elevators, spoilers or rudders. For example, the pre-defined path of removal of a rudder actuator from the tail of an aircraft may involve a rotation of the actuator about a substantially vertical axis to move the actuator away from the tailfin. The pre-defined path may, in this case, further comprise a rotation of the actuator about a substantially horizontal axis. Such a movement may orient the actuator such that a winch arrangement may be conveniently used to lower the actuator to the ground.

BRIEF DESCRIPTION OF THE DRAWINGS

An embodiment of the present invention is described by way of example only with reference to the attached schematic drawings of which.

The reader should note that, in many of the drawings, certain parts have been omitted for the sake of clarity.

DETAILED DESCRIPTION OF EMBODIMENTS

Figure 1:
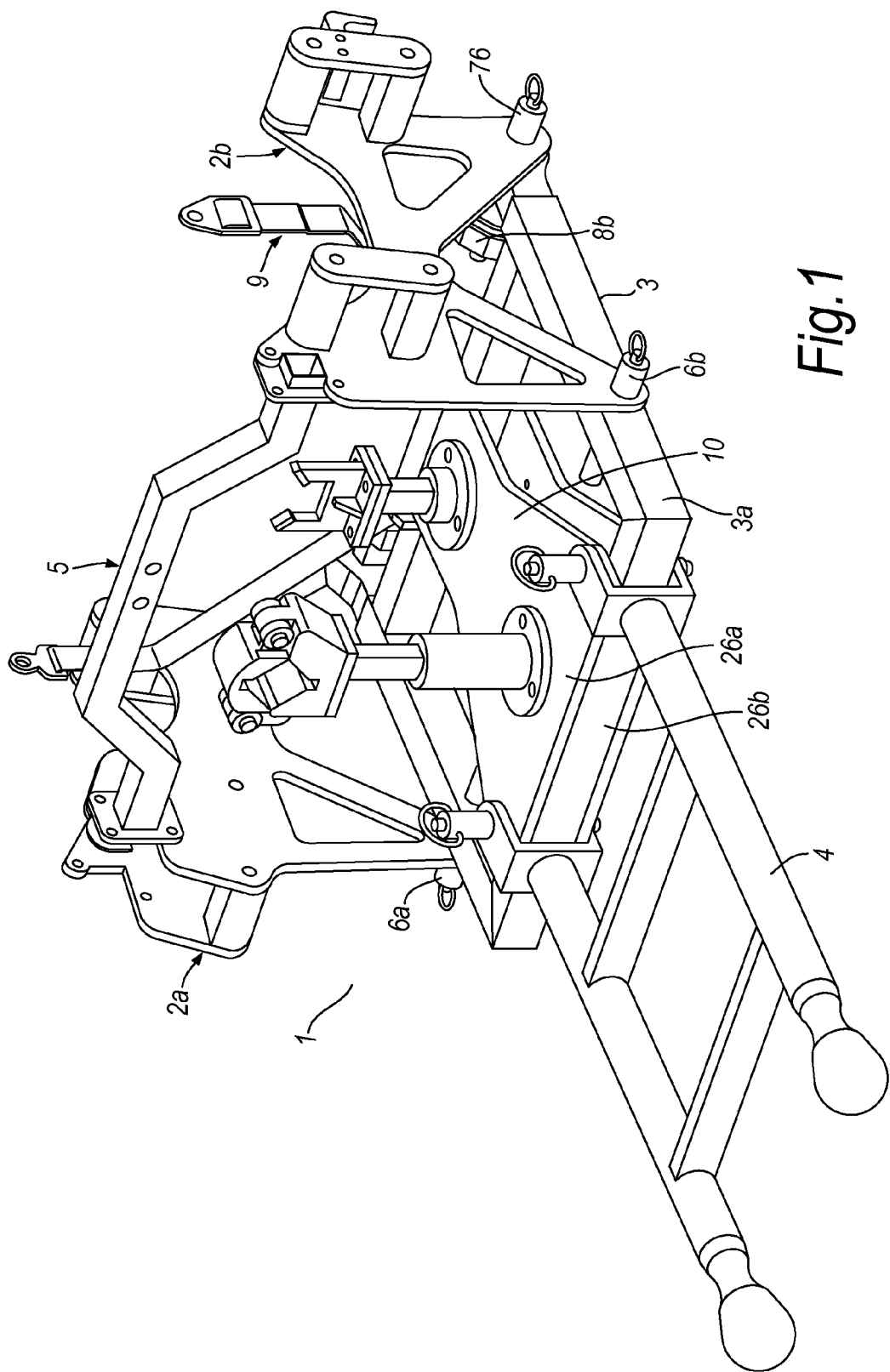
FIG. 1 is a perspective view of a device in accordance with the embodiment.
Figure 2:
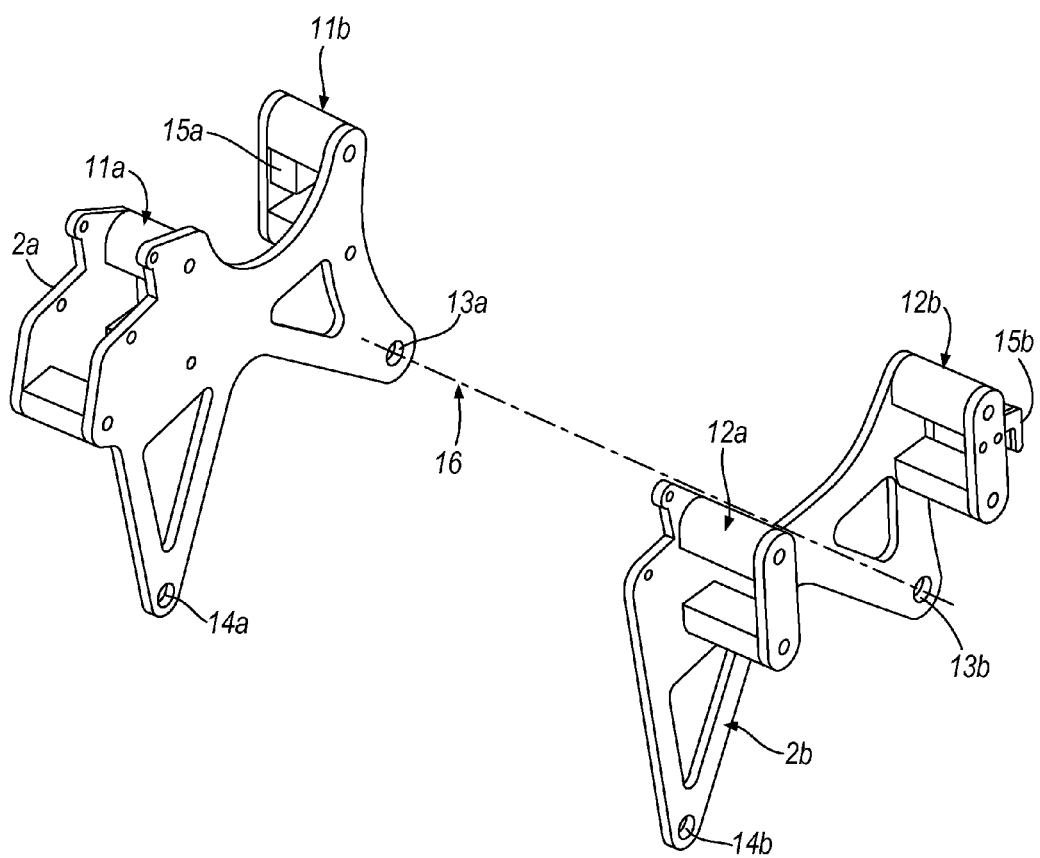
FIG. 2 is a perspective view of the two brackets used in the device of FIG. 1 to attach the device to the aircraft.

FIG. 1 shows a device in accordance with a first embodiment of the present invention for facilitating the removal of a component from an aircraft. The device 1 comprises attachment portions in the form of brackets 2a, 2b for attaching the device to the aircraft and a guide member 3 comprising a support portion 10 for receipt of the component, the guide member 3 being mounted (pivotally, in this case) to allow, in use, the support portion to be movable away from the aircraft. The device 1 is also provided with handles 4 for assisting in the movement of the guide member. The device of FIG. 1 is designed to remove actuators from aircraft, particularly those used to control the movement of the ailerons. The guide member 3 is in the form of plates 26a, 26b arranged across a frame 3a. This provides a guide member 3 that is strong, yet light, which is obviously a benefit for the handler of the device and a benefit if the device is to be stored on an aircraft. The device 1 in FIG. 1 is shown with the guide member 3 and handles 4 being attached to the brackets 2a, 2b. Bolts 6a, 6b secure the guide member 3 to the brackets 2a, 2b by extending through frame 3a into apertures 14a, 14b formed in brackets 2a, 2b respectively (see FIG. 2) and, in use, secure the guide member in position to receive the component from the aircraft. Bolts 7a, 7b extend through an end portion (not shown) of the guide member 3 into a respective adjuster 8a, 8b. This arrangement allows the guide member 3 to pivotally move about the axis (shown as reference numeral 16 in FIGS. 2 and 3) provided by bolts 7a, 7b and adjusters 8a, 8b. Referring to FIG. 2, the bolts 7a, 7b extend through apertures 13a, 13b respectively in brackets 2a, 2b respectively. The adjusters permit the position of the guide member to be altered along the direction of the pivotal axis 16. This is of particular benefit in the present case where the device is for the removal of an actuator from an aircraft. This feature allows the device to be used to remove more than one type of actuator; the spacing between adjacent ribs on which the device is mounted is different for each type of actuator and being able to adjust the position of the guide member along the pivotal axis allows the device to be used to remove different types of actuator. Further referring to FIG. 2, each bracket 2a, 2b is provided with two D-nose clamps 11a, 11b, and 12a, 12b respectively for securing the respective bracket to the rib of an aircraft wing.

Different sets of brackets may be used to help remove similar components from different parts of the aircraft.

Figure 3:
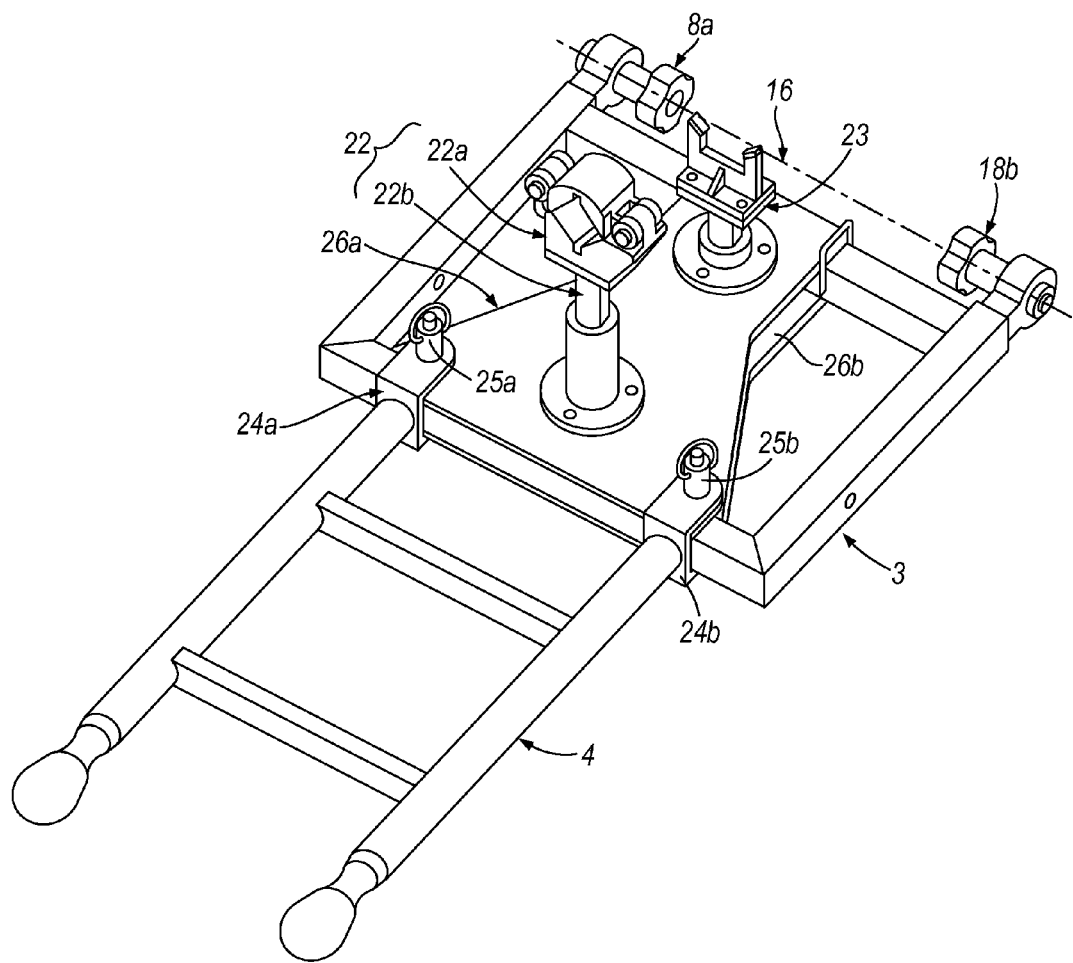
FIG. 3 is a perspective view of the guide member used in the device of FIG. 1.

The guide member and handles arrangement is now further described with reference to FIG. 3. The handles 4 are readily removable from the guide member 3. This facilitates ease of storage. The handles 4 are secured to the frame 3a of guide member 3 by bolts 25a, 25b extending through apertures formed in handle clamps 24a, 24b and plates 26a, 26b. Guide member 3 is provided with first support member 22 and second support member 23 which together are provided for supporting an actuator once the actuator has been detached from the aircraft. First support member 22 comprises a clamp 22*a* for securing the device 1 to the actuating pin of an actuator and an extendible post that allows the clamp 22*a* to be moved to a suitable position so as to clamp the actuating pin.

The operation of the device of FIG. 1 in a method in accordance with the present embodiment is now described with reference to FIGS. 4 to 9 illustrating the removal of an actuator from an aircraft.

Figure 4:
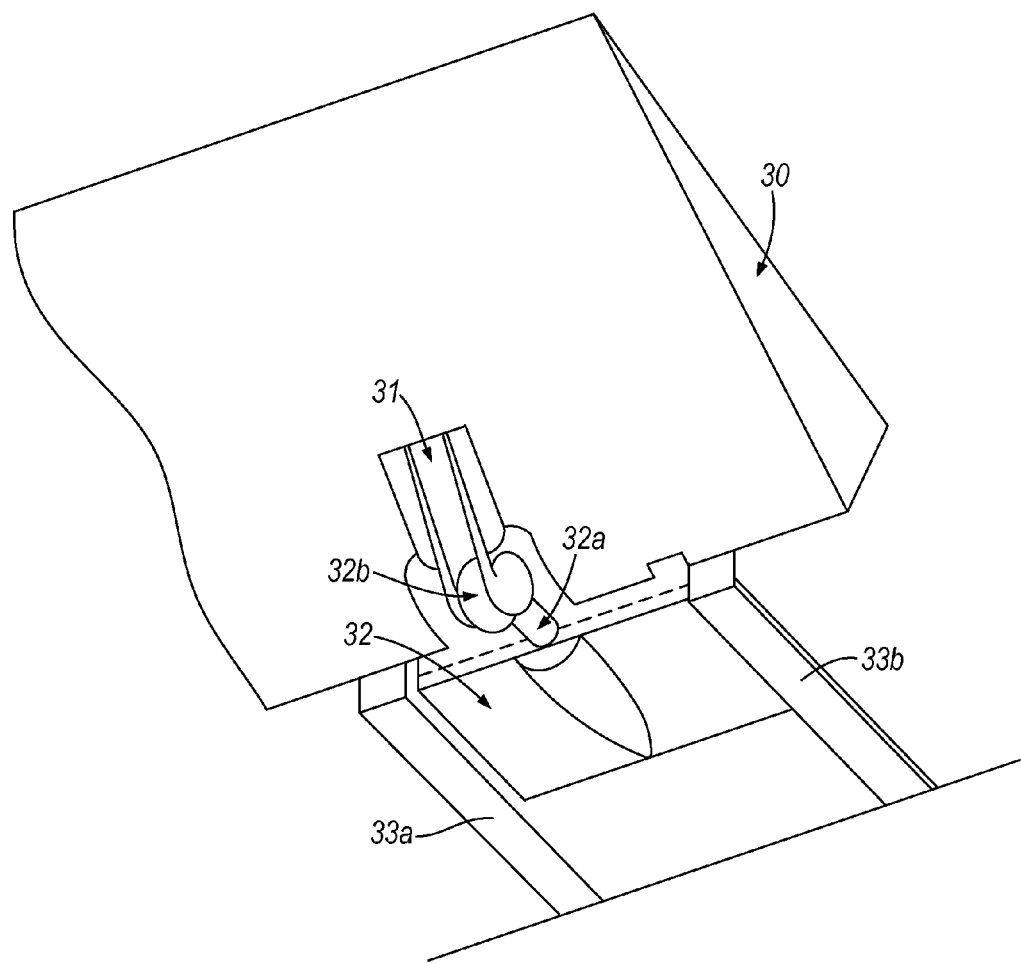
FIG. 4 is a perspective view of part of the underside of an aircraft wing, the aileron having been moved to an elevated position and the underwing access panels having been removed.
Figure 5:
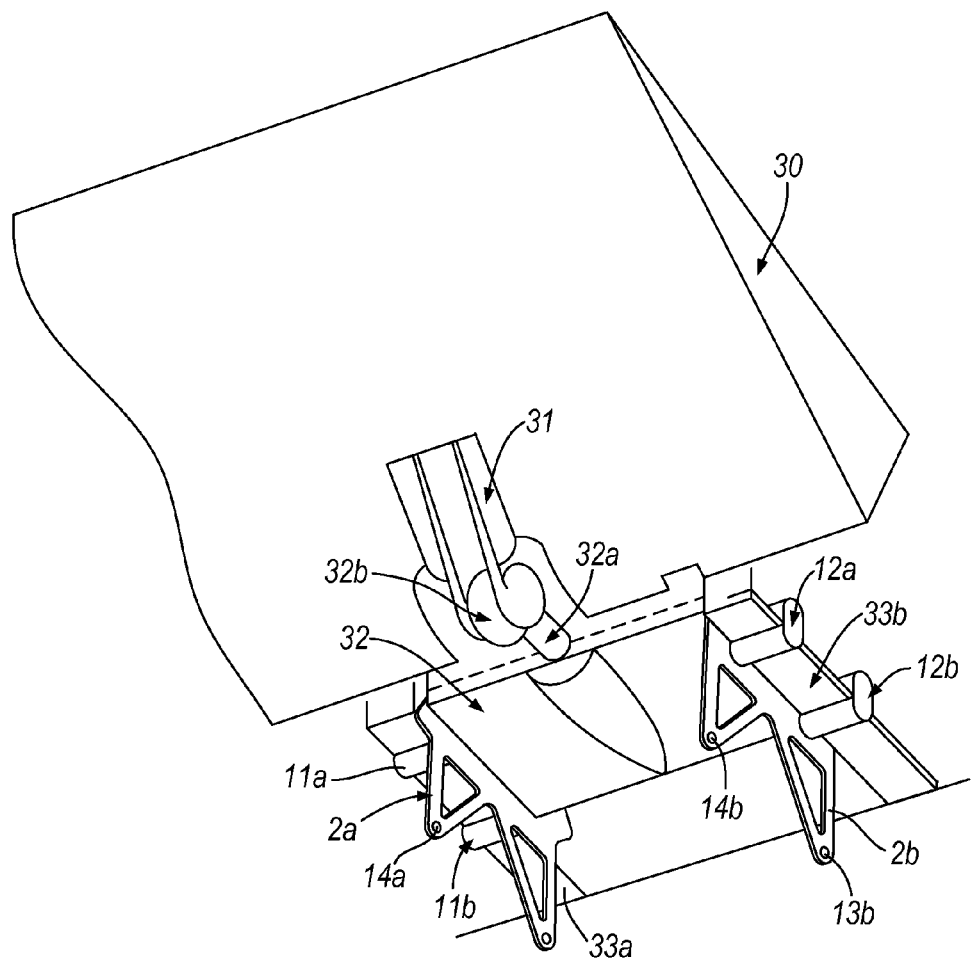
FIG. 5 is a perspective view of the underside of an aircraft wing as shown in FIG. 4, the attachment brackets of the device in accordance with the embodiment having been attached to the aircraft.
Figure 6:
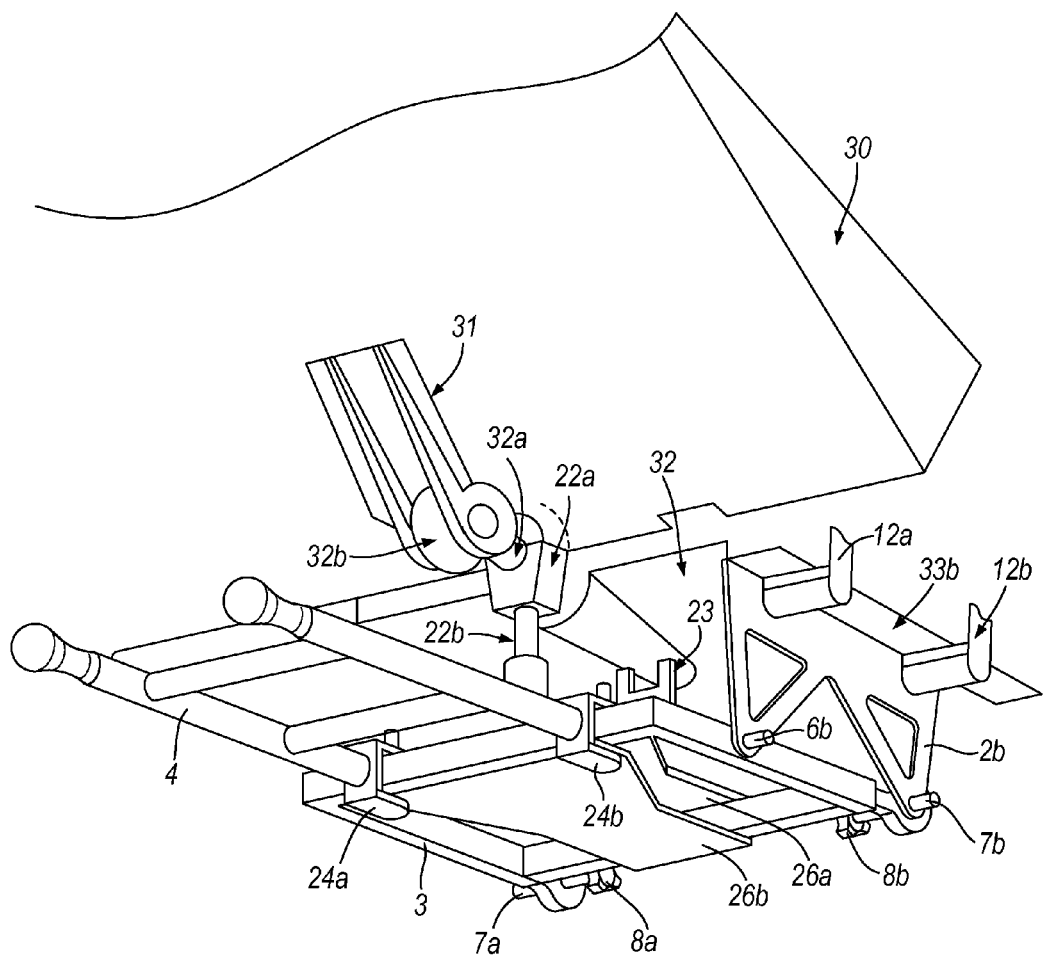
FIG. 6 is a perspective view of the underside of the aircraft wing as shown in FIG. 5, the device in accordance with the embodiment being attached to the actuator for removal of the actuator.

An aileron 30 is moved to an elevated position and one or more underwing panels is removed from the aircraft, leaving the aircraft as shown in FIG. 4. With the aileron in an elevated position, the actuating pin 32*a* of the actuator 32 is extended, facilitating simple clamping of the actuating pin 32*a* as described in more detail below. Referring to FIG. 5, the brackets 2*a*, 2*b* are attached to wing ribs 33*a*, 33*b* respectively using the D-nose clamps 11*a*, 11*b*, 12*a*, 12*b*. Locating blocks 15*a*, 15*b* as shown in FIG. 2 ensure that the brackets 2*a*, 2*b* are correctly fitted to ribs 33*a*, 33*b*. Referring to FIGS. 2, 3, 5 and 6, the guide member 3 and handles 4 are then fitted onto the aircraft using brackets 2*a*, 2*b*. Briefly, bolts 7*a*, 7*b* are inserted through apertures 13*a*, 13*b* respectively, through end portions of frame 3*a*, into adjusters 8*a*, 8*b* respectively. This effectively pivotally mounts the guide member 3, with pivotal motion being permitted about axis 16. Adjusters 8*a*, 8*b* may then be adjusted so as to move the guide member 3 in a direction parallel to the axis 16, allowing the position of first support member 22 to be varied in the same direction so that the actuating pin 32*a* may be secured by clamp 22*a*. The user then uses the handles 4 to swing the guide member up to the position shown in FIG. 6. Bolts 6*a*, 6*b* secure the guide member 3 to the brackets 2*a*, 2*b* by extending through frame 3*a* into apertures 14*a*, 14*b* formed in brackets 2*a*, 2*b* respectively (see FIG. 2). This secures the guide member 3 in position to receive the actuator from the aircraft. The length of extendible post 22*b* may be varied so that clamp 22*a* may be secured around the actuating pin 32*a* of the actuator 32. The extendible post 22*b* may be retracted to allow the position of the guide member 3 along the axis 16 to be adjusted so that when the post 22*b* is extended, the clamp 22*a* secures around the actuating pin 32*a*. Second support member 23 supports the actuator towards its rear. A belt 9 shown in FIG. 1 is tied around the actuator to provide additional support when the actuator is released from the aircraft and rotated down.

The actuator 32 is then detached from the aircraft by, inter alia, removing the locking pin (not shown) that secures the head 32*b* of the actuating pin 32*a* to the actuator connection plate 31.

Figure 7:
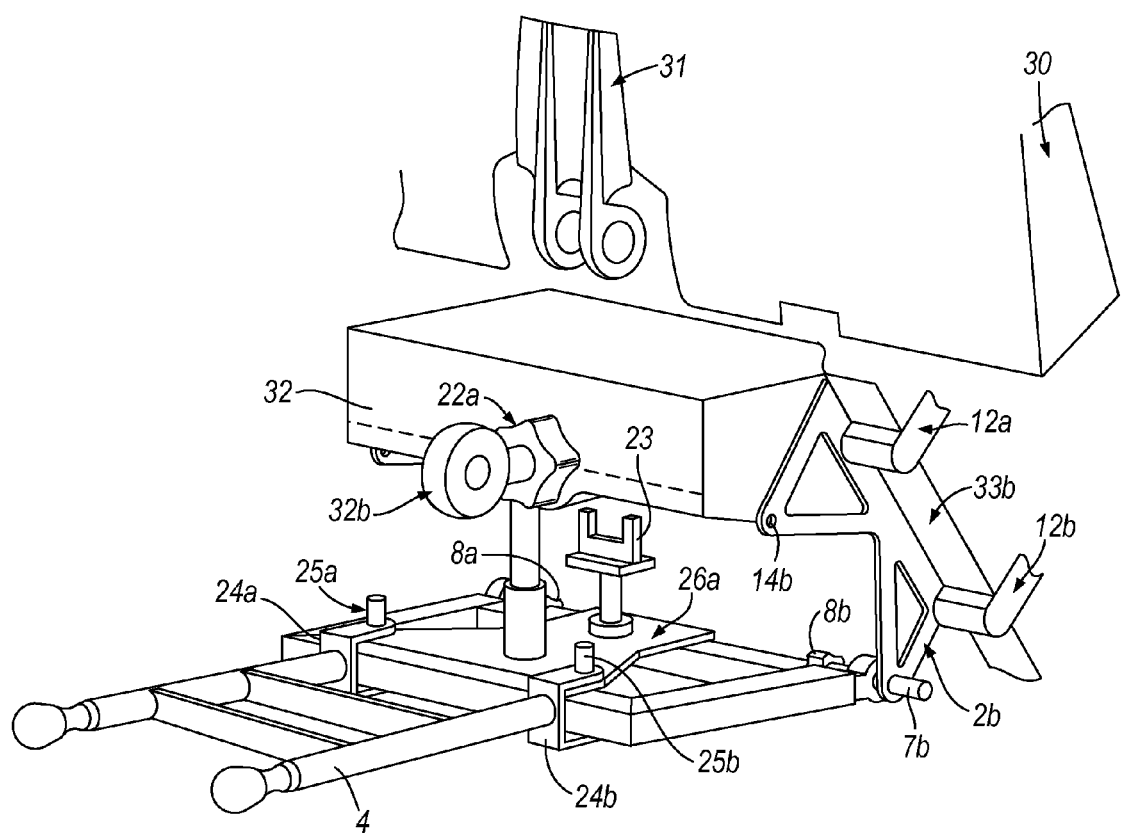
FIG. 7 is a perspective view of the underside of the aircraft wing as shown in FIG. 6 showing the lowering of the actuator out of the aircraft wing.
Figure 8:
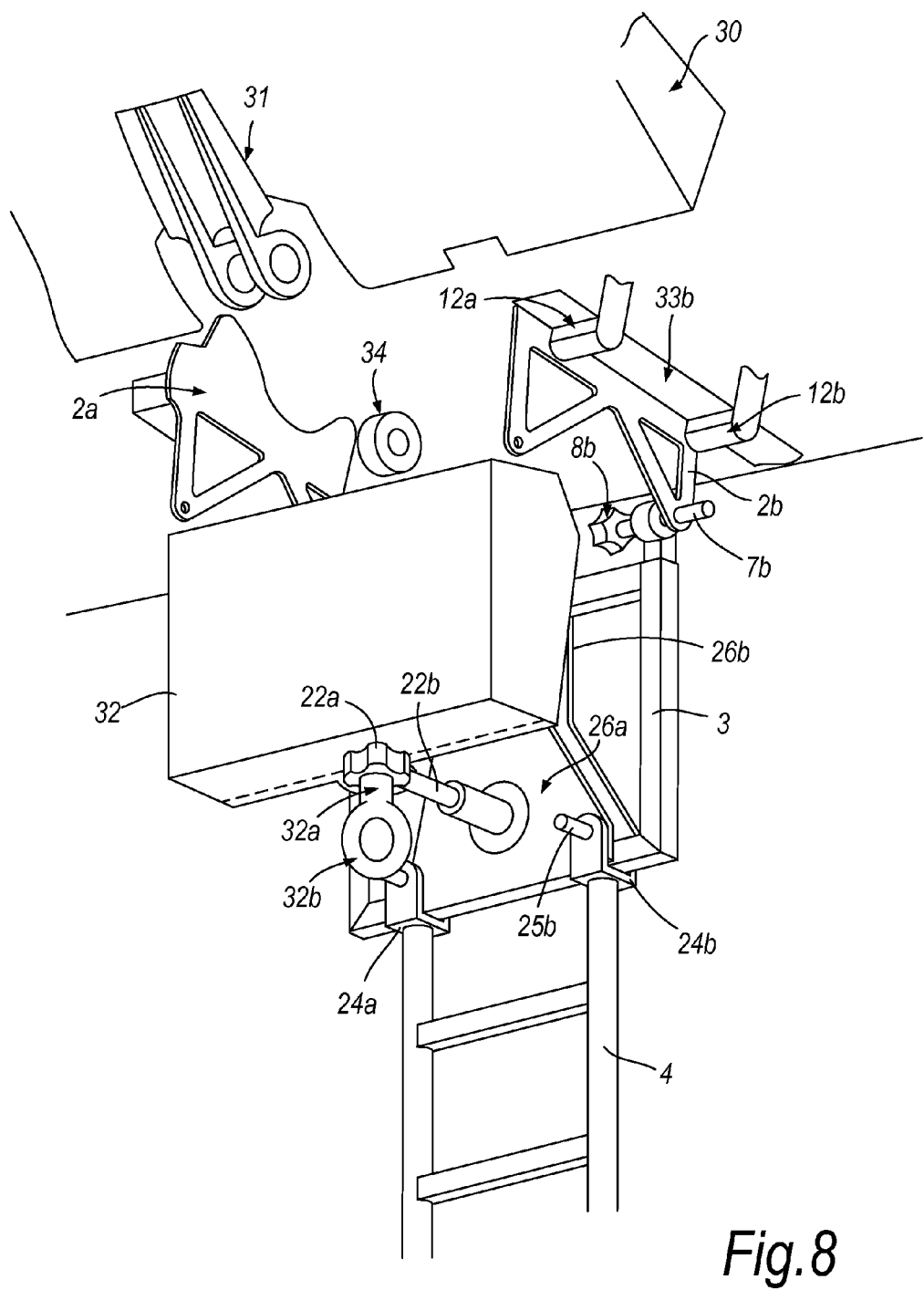
FIG. 8 is a perspective view of the underside of the aircraft wing as shown in FIG. 7, the actuator having been rotated by 90° relative to the ground.

Bolts 6*a*, 6*b* are then removed, thus allowing the guide member to move about pivot axis 16 as shown in FIG. 7 to a position as shown in FIG. 8. Thus the guide member moves in a predetermined manner so that the actuator follows a predefined path of removal from the aircraft.

In this position, the additional support provided by the belt 9 helps prevent the actuator 32 from falling away from the device. FIG. 8 also shows a lifting eye 34 attached to the rear of the actuator.

Figure 9:
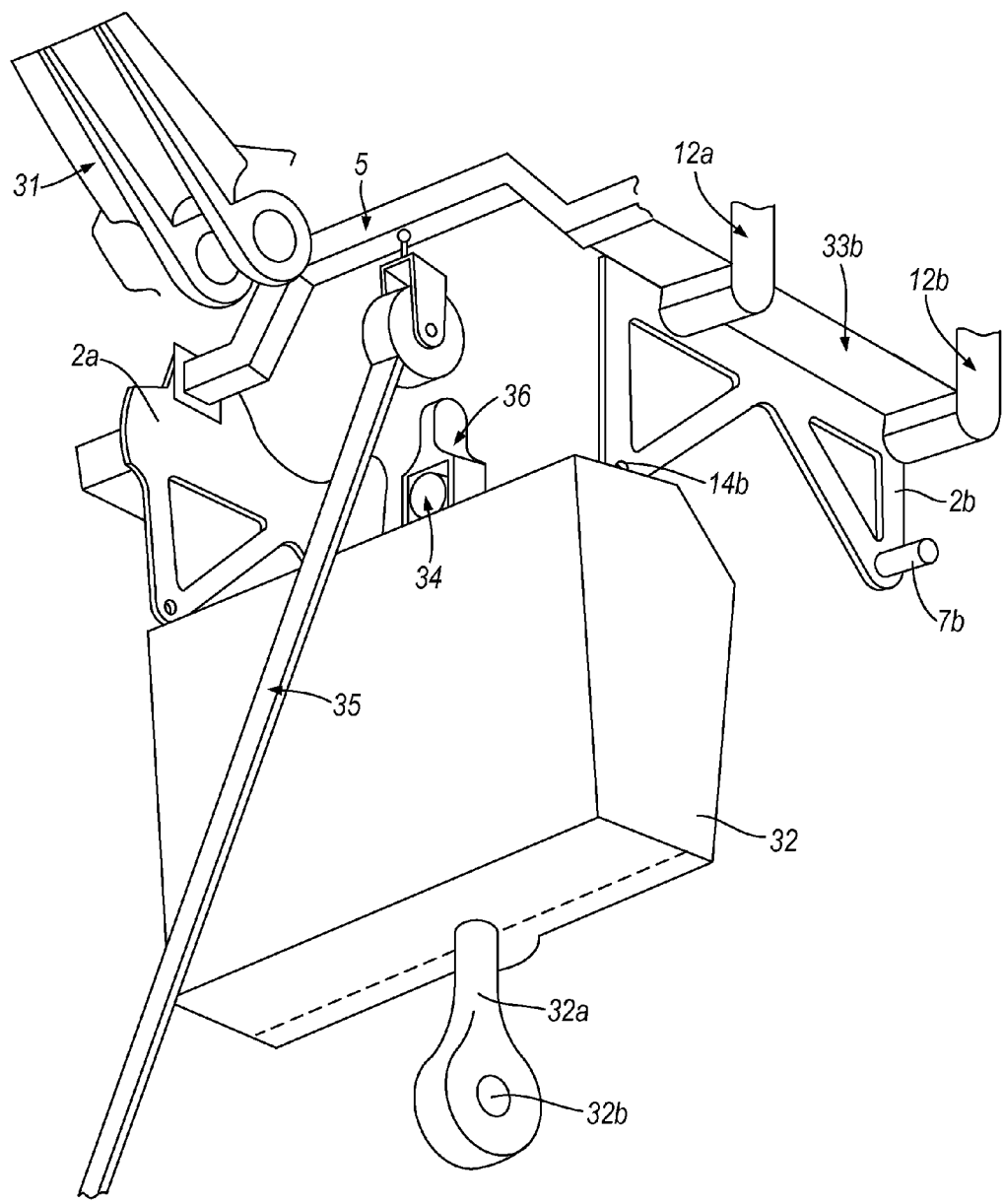
FIG. 9 is a perspective view of the underside of the aircraft wing as shown in FIG. 8, the guide member having been removed, and a hoist having been erected to lower the actuator to the ground.

FIG. 9 shows how a conventional hoist may be arranged to lower the actuator onto the ground or onto another suitable surface (e.g. a flat-bed trolley used to transport the actuator). A hoist support bar 5 is fixed onto brackets 2*a*, 2*b* and a hoist 35 is then attached to the hoist support bar 5. A lifting eye clamp 36 is placed over lifting eye 34, with a bar (not shown) extending through the lifting eye 34 to prevent the actuator from falling to the ground. The lifting eye clamp 36 is connected to the hoist 35 with a rope (not shown). The guide member 3 and handles 4 arrangement are then detached from the actuator and optionally detached from brackets 2*a*, 2*b*. The hoist 35 is then used to lower the actuator to the ground in a controlled manner.

Those skilled in the art will realise that the device of the present invention allows a user to remove components from aircraft safely, with little risk of damage to the component or the rest of the aircraft. This is possible because the device is designed and arranged so that the component follows a predefined (and safe) path when being removed from the aircraft. In designing the device, firstly, a path of removal of the component (in this case, the actuator) from the aircraft is determined. This path is advantageously chosen so that there is no or minimal damage to either the aircraft or the actuator on removal of the actuator. Such a path of removal may be complex. In the present case, the path of removal of the actuator involves a movement away from the aileron 30 along a circular arc, the centre of the arc being located below the actuator and therefore remote from the actuator and aircraft. A guide member 3 is then designed, such that when the actuator 32 is attached to the guide member and when the guide member is attached to the aircraft, the guide member is movable so that the component follows the desired path of removal of the component. The movement in an arc is created by providing a guide member that is pivotally mounted at the relevant centre of rotation. Once the guide member 3 has been designed and manufactured, it may be used to remove the actuator from the aircraft along the predefined path of removal.

Whilst the present invention has been described and illustrated with reference to a particular embodiment, it will be appreciated by those of ordinary skill in the art that the invention lends itself to many different variations not specifically illustrated herein. For that reason, reference should be made to the claims for determining the true scope of the present invention. By way of example, certain variations to the above-described embodiments will now be described.

The device and method of the present invention may be used to remove other components from an aircraft, and from other parts of the aircraft (such as from the tail). For example, an actuator may be readily removed from the tail of an aircraft, the elevators being raised to allow access to the actuator in the tail.

The device may further be provided with a slide (optionally replacing the hoist arrangement). Considering FIG. 8, actuator 32 would be lowered using the guide member 3 onto a slide, optionally formed by two substantially parallel rails. The actuator would be detached from the first support member 22 so that the actuator would either be allowed to slide freely down the slide or the slide would be controlled by a hoist arrangement. Such a slide would optionally allow the speed of the descent of the actuator to be controlled.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A method of removing a component from an aircraft in which the component is installed, the method comprising:

(a) attaching a device comprising a guide member to the aircraft in which the component is installed, the guide member being pivotally mounted for rotational motion about a pivot point;
(b) attaching the installed component to the guide member;
(c) detaching the component from the rest of the aircraft; and
(d) rotating the guide member about the pivot point thereby moving the guide member and the component away from the aircraft, said rotation of the guide member about the pivot point moving the component along a predefined path of removal assisted by the weight of the component.

2. A method according to claim 1, wherein the device comprises a handle operatively associated with the guide member and the handle is used to rotate the guide member about the pivot point.

3. A method according to claim 1, wherein the pivot point is remote from the component to be removed.

4. A method according to claim 1, wherein the path of removal is on the underside of the aircraft.

5. A method according to claim 1, wherein, prior to the detaching step, the component is above the pivot point.

6. A method according to claim 1, wherein the component is initially positioned in the wing or tail of the aircraft.

7. A method according to claim 1, wherein the mass of the component is more than 25 kg.

8. A method according to claim 1, wherein the device comprises a guide member that is separable from one or more mounting components which are attachable to the aircraft, and wherein step (c) comprises attaching the one or more mounting components to the aircraft and then attaching the guide member to the one or more mounting components.

9. A method according to claim 1, the device comprising a support portion for supporting the component, wherein prior to step (b), removing an outer panel of the aircraft to provide access to the component to be removed,
wherein step (d) comprises moving the support portion and the component away from the aircraft.

10. A method according to claim 9, wherein the component is an actuator attached to a wing or tail of the aircraft, and the outer panel is removed from the underside of the wing or tail.

11. A method according to claim 1, wherein the aircraft has one or more ribs and the device is attached to said one or more ribs of the aircraft.

12. A method according to claim 6, wherein the wing or tail includes an aileron or an elevator, the aileron or elevator being moved to an elevated position prior to attaching the device to the aircraft.

13. A method of removing a component from an aircraft using a device which includes
a mounting member providing an attachment portion for attaching the device to the aircraft;
a guide member comprising a support portion for receipt of the component to be removed, the guide member being pivotally mounted to the mounting member so that, when the component is being supported by the support portion in use, the support portion moves pivotally away from the aircraft along a predefined path; and
a handle operatively associated with the guide member for assisting in the pivotal movement of the guide member;
said method comprising:
attaching the attachment portion of the mounting member of the device to the aircraft;
attaching the component to the support portion of the guide member of the device;
detaching the component from the rest of the aircraft; and
using a handle operatively associated with the guide member, moving the guide member about a pivot point, at which the guide member is pivotally mounted to the mounting member, so that the component moves pivotally away from the aircraft along a predefined path, wherein the moving of the guide member along the predefined path is assisted by the weight of the component.

14. A method according to claim 13, wherein the moving of the guide member is effected manually.

15. A method according to claim 13, wherein the path of removal is on the underside of the aircraft.

16. A method according to claim 13, wherein, prior to the detaching step, the component is above the pivot point.

17. A method according to claim 13, further comprising
before said attaching the component to the support portion of the guide member of the device, removing an outer panel of the aircraft to provide access to the component to be removed.

18. A method according to claim 17, wherein the component to be removed is an actuator attached to a wing or tail of the aircraft, and the outer panel is removed from the underside of the wing or tail.

19. A method according to claim 18, wherein the wing or tail includes an aileron or an elevator, the aileron or elevator being moved to an elevated position prior to attaching the device to the aircraft.

20. A method according to claim 13, wherein the aircraft has one or more ribs and the device is attached to said one or more ribs of the aircraft.

* * * * *